(12) United States Patent
Klappert et al.

(10) Patent No.: US 12,392,862 B2
(45) Date of Patent: Aug. 19, 2025

(54) RADIO FREQUENCY (RF) ENVIRONMENT MONITOR AND RESPONSE SYSTEM

(71) Applicant: BAE SYSTEMS Information and Electronic Systems Integration Inc., Nashua, NH (US)

(72) Inventors: Andrew E. Klappert, King Park, NY (US); Robert F. Saracino, Lindenhurst, NY (US); Richard J. Lavery, Huntington, NY (US); David C. Ringlen, Coram, NY (US); Robert C. Bonino, Northport, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 382 days.

(21) Appl. No.: 17/947,256

(22) Filed: Sep. 19, 2022

(65) Prior Publication Data

US 2024/0094331 A1     Mar. 21, 2024

(51) Int. Cl.
| | | |
|---|---|---|
| *G01S 7/36* | (2006.01) | |
| *G01S 7/02* | (2006.01) | |
| *G01S 7/28* | (2006.01) | |
| *G01S 7/292* | (2006.01) | |
| *G01S 13/78* | (2006.01) | |

(52) U.S. Cl.
CPC ............ *G01S 7/021* (2013.01); *G01S 7/2813* (2013.01); *G01S 7/292* (2013.01); *G01S 7/36* (2013.01); *G01S 13/78* (2013.01)

(58) Field of Classification Search
CPC ........ G01S 7/021; G01S 7/2813; G01S 7/292; G01S 7/36; G01S 13/78
See application file for complete search history.

(56) References Cited

U.S. PATENT DOCUMENTS

| | | |
|---|---|---|
| 11,002,847 B2 | 5/2021 | Saracino et al. |
| 2009/0245788 A1 | 10/2009 | Varshneya et al. |
| 2014/0085125 A1 | 3/2014 | Ivtsenkov et al. |

(Continued)

OTHER PUBLICATIONS

International Search Report, PCT/US23/33016, mailed Jan. 29, 2024, 20 pages.

*Primary Examiner* — Vladimir Magloire
(74) *Attorney, Agent, or Firm* — Gary McFaline (57) ABSTRACT

Techniques are provided for dynamic performance enhancement of radio frequency (RF) based systems. A system implementing the techniques according to an embodiment includes a waveform decoder configured to perform message decoding operations on a received RF signal waveform and to provide a decoding validation result for the message decoding operations. The system also includes a waveform attribute analyzer configured to analyze physical characteristics of the received RF signal waveform and to provide an attribute validation result for the physical characteristics. The system further includes a statistics analyzer configured to generate a statistic based on the decoding validation results and the attribute validation results and a thresholding system configured to generate anomaly detection based on a comparison of the generated statistic to a threshold value. In some embodiments, the RF signal waveform is an Identification Friend or Foe (IFF) transponder waveform or an IFF interrogator waveform.

17 Claims, 6 Drawing Sheets

(56) References Cited

U.S. PATENT DOCUMENTS

2016/0226892 A1    8/2016  Sen et al.
2018/0299541 A1   10/2018  Aharoni et al.
2020/0271773 A1*  8/2020  Saracino ............... H04L 9/3271
2022/0268884 A1*  8/2022  Wu ......................... G01S 13/34

* cited by examiner

RADIO FREQUENCY (RF) ENVIRONMENT MONITOR AND RESPONSE SYSTEM

FIELD OF DISCLOSURE

The present disclosure relates to detection of anomalies in an RF environment, and more particularly to a system for monitoring and responding to such RF anomalies.

BACKGROUND

An RF-based system can be adversely affected by the RF environment in which it operates. For example, self-interference, RF jamming, RF cyber-attacks, and other anomalies, whether intentional or un-intentional, can degrade system performance.

Although the following Detailed Description will proceed with reference being made to illustrative embodiments, many alternatives, modifications, and variations thereof will be apparent in light of this disclosure.

DETAILED DESCRIPTION

Techniques are provided herein for sensing and responding to anomalies in an operational RF environment. As noted previously, an RF-based system can be adversely affected by the RF environment in which it operates. For example, self-interference, RF jamming, RF cyber-attacks, and other anomalies, whether intentional or un-intentional, can degrade system performance.

To this end, and in accordance with an embodiment of the present disclosure, an RF environment monitor and response system is described. In an example, system maintains statistics about unexpected results, failures, or other detected anomalies that occur in the process of decoding messages based on received RF signals. Abnormal physical characteristics of the waveforms of those RF signals may also be detected and included in the statistics. The statistics, which may be accumulated for multiple messages over a suitable period of time (e.g., 60 seconds to several hours of contiguous and/or non-contiguous time periods), are compared to a threshold value (or values) to determine that the current RF environment has been impacted, and to respond in an appropriate manner to mitigate the effect of that impact, as will be explained in greater detail below.

The disclosed RF environment monitor and response system can be used, for instance, with receiver systems in a wide variety of applications including, for example, radar systems and communication systems that can be deployed on aircraft (manned and unmanned), guided munitions and projectiles, space-based systems (e.g., satellite-based platforms), electronic warfare systems, and other communication systems including cellular telephones and smartphones, although other applications will be apparent. In accordance with an embodiment, the RF environment monitor and response system includes a waveform decoder configured to perform message decoding operations on a received RF signal waveform and to provide a decoding validation result for one or more of the message decoding operations. The system also includes a waveform attribute analyzer configured to analyze physical characteristics of the received RF signal waveform and to provide an attribute validation result for one or more of the physical characteristics. The system further includes a statistics analyzer configured to generate a statistic based on the decoding validation results and the attribute validation results. The system further includes a thresholding system configured to determine if processing parameters require adjustment, based on a comparison of the generated statistic to a threshold value. In some embodiments, the RF signal waveform is an Identification Friend or Foe (IFF) transponder waveform or an IFF interrogator waveform.

It will be appreciated that the techniques described herein may provide improved signal processing and/or improved security against RF-based cyber-attacks compared to systems that attempt to decode all received messages without the ability to recognize suspicious signals or that simply fail silently when the message or waveform has unexpected characteristics. It will be further appreciated that mitigation of such RF-based cyber-attacks as variously described herein includes any reduction in the negative impact that may stem from such attacks, whether that reduction amounts to, for example, a complete neutralization of a given cyber-threat, or a partial neutralization of a given cyber-threat (e.g., where some but not all of intended malicious impact to a given system is thwarted), or a temporary (partial or complete) neutralization of a given cyber-threat. Numerous embodiments and applications will be apparent in light of this disclosure.

System Architecture

Figure 1:
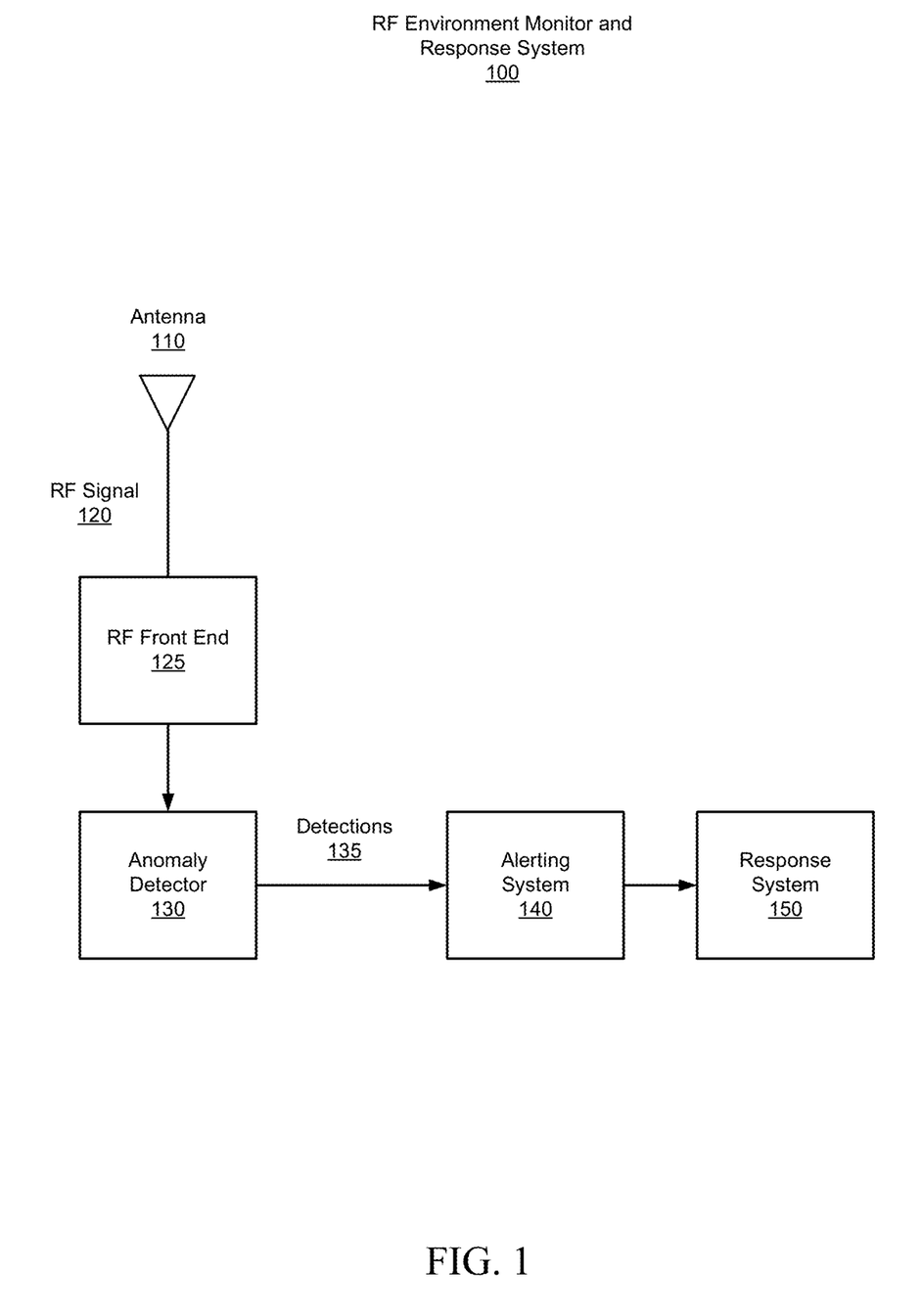
FIG. 1 is a block diagram of an RF environment monitor and response system, configured in accordance with certain embodiments of the present disclosure.

FIG. 1 is a block diagram of an RF environment monitor and response system 100, configured in accordance with certain embodiments of the present disclosure. The RF environment monitor and response system 100 is shown to include an antenna 110, an RF front end 125, an anomaly detector 130, an alerting system 140, and a response system 150. In some embodiments, the system 100 may be part of a communication system or radar system of a platform such as an aircraft, a projectile, a missile, a space-based platform, or a ground based platform, although other possibilities exist. In a more general sense, the system 100 may be deployed on any platform that receives RF signals and may be subject to challenging RF environments that may include, for example, self-interference, RF jamming, RF cyber-attacks, signal congestion, or other anomalies.

The antenna 110 and RF front end 125 are configured to transmit and receive RF signals 120 to and from various actors or targets in the environment. For example, in an IFF system, a platform may be configured to transmit or respond to IFF interrogation messages that are encoded in RF signals. The RF front end may include filters, amplifiers, frequency converters, and/or other functional components as needed for a particular application. In some embodiments, the RF front end components, or parts thereof, may be included in the anomaly detector 130.

The operation of the anomaly detector 130 will be described in detail below, but at a high level, the anomaly detector 130 is configured to monitor for abnormalities or unexpected characteristics in the received signal waveforms, and the messages that are decoded from those waveforms. The anomaly detector is also configured to collect statistics on those findings and to determine that a threat may be present based on those statistics, resulting in an anomaly detection 135.

The alerting system 140 is configured to provide an alert in response to a cyber-attack detection 135 generated by the anomaly detector 130. In some embodiments, the alert may be an aural alert, a visual alert, a haptic alert, or any combination thereof. The alert may be provided to a user of the system such as the pilot of an aircraft or the operator of the platform, for example a tracking station or weapons system.

The response system 150 is configured to perform an action in response to the generated anomaly detection. In some embodiments the action may include geolocating the source of the received RF signal waveform, performing anti jamming frequency excision, suspending transmission of message replies which might be exploited by the attacker in a spoofing attempt, and/or limiting the rate of generated replies to minimize RF congestion and to prevent a denial of service attack.

Figure 2:
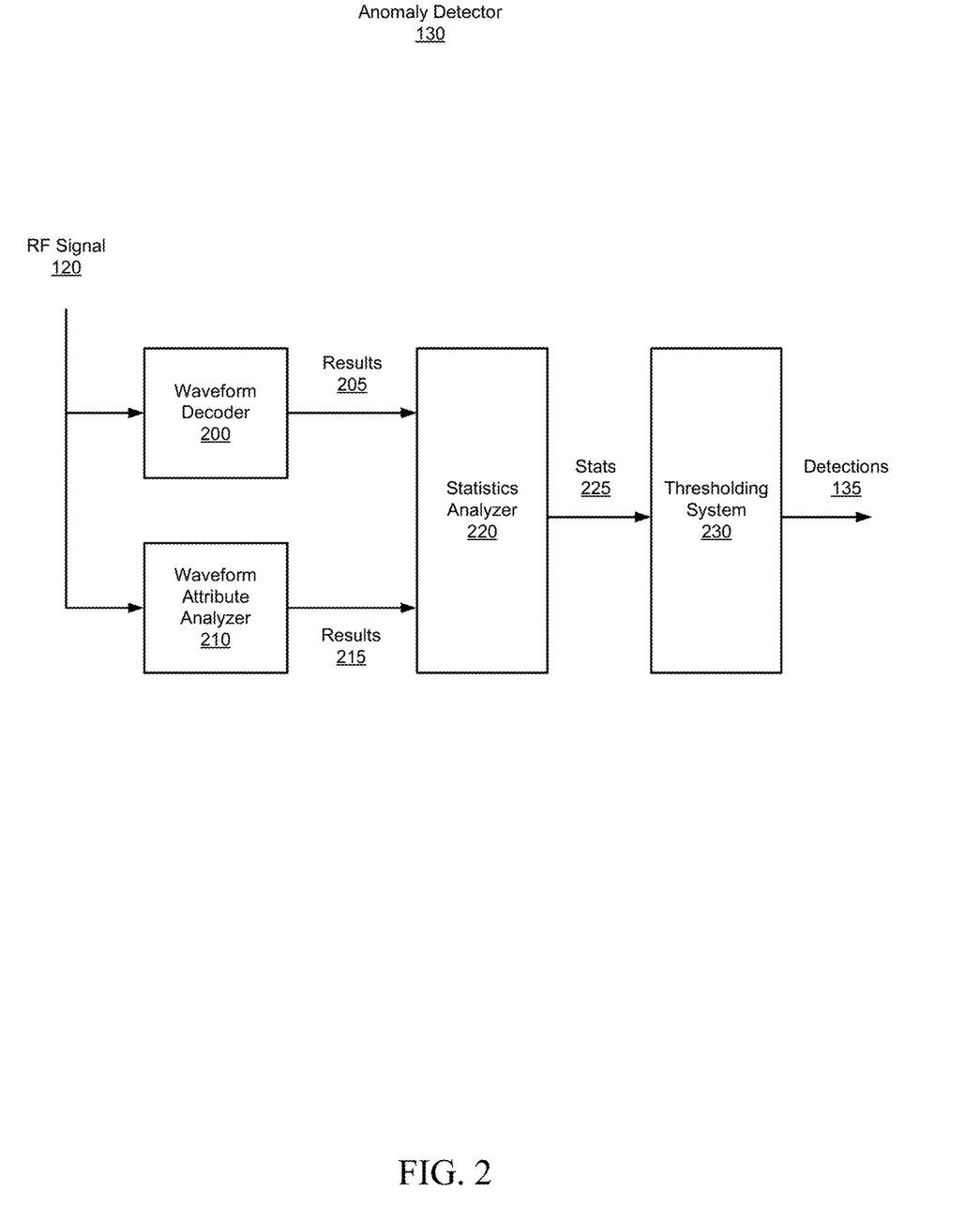
FIG. 2 is a block diagram of the anomaly detector of FIG. 1, configured in accordance with certain embodiments of the present disclosure.

FIG. 2 is a block diagram of the anomaly detector 130 of FIG. 1, configured in accordance with certain embodiments of the present disclosure. The anomaly detector 130 is shown to include a waveform decoder 200, a waveform attribute analyzer 210, a statistics analyzer 220, and a thresholding system 230.

The waveform decoder 200 is configured to perform message decoding operations on the received RF signal waveform and to provide a decoding validation result 205 for each of the message decoding operations, as will be described below. In some embodiments, message decoding may be performed to provide normal message handling operations for the platform. Unlike existing systems, however, which may silently fail in the event of a failure in any of the decoding operations, the waveform decoder 200 is configured to provide all relevant information about the nature of failures in any of the decoding operations for further evaluation, as described below.

The waveform attribute analyzer 210 is configured to analyze physical characteristics of the received RF signal waveform and to provide an attribute validation result 215 for each of the physical characteristics, as will be described below.

The statistics analyzer 220 is configured to generate statistics 225, based on the decoding validation results and the attribute validation results, for the current waveform and/or previously received waveforms. In some embodiments, the statistics 225 include failure occurrence rates indicated by the decoding validation results and the attribute validation results. Occurrence rates may, for example, take the form of M failures out of N decoding operation attempts or M failures out of N physical characteristic analyses.

The thresholding system 230 is configured to generate an anomaly detection 135 based on a comparison of the generated statistics to threshold values. The threshold values may be selected to balance the probability of false alarm with the probability of detection of an actual anomaly. In some embodiments, different thresholds may be selected for each of the statistics as the relative anomaly likelihood may vary from one type of validation results to another.

Figure 3:
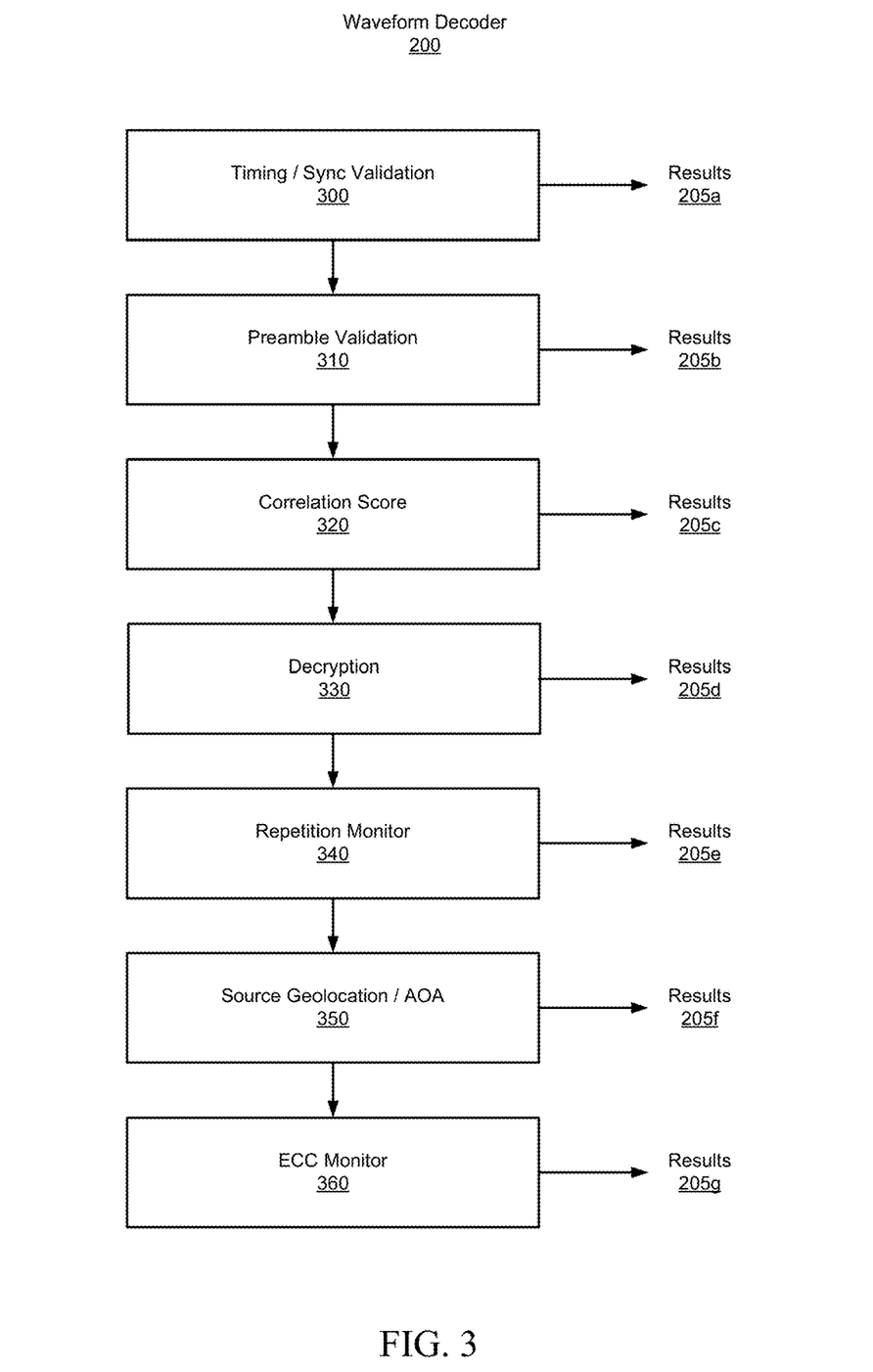
FIG. 3 is a block diagram of the waveform decoder of FIG. 2, configured in accordance with certain embodiments of the present disclosure.

FIG. 3 is a block diagram of the waveform decoder 200 of FIG. 2, configured in accordance with certain embodiments of the present disclosure. The waveform decoder 200 is shown to include a timing/synchronization validation circuit 300, a preamble validation circuit 310, a correlation scoring circuit 320, a decryption circuit 330, a repetition monitor 340, a source geolocating circuit 350, and an error correction code (ECC) monitor.

The timing/synchronization validation circuit 300 is configured to validate timing and synchronization of the message against expected values that depend on the application, waveform and message protocol. Abnormal timing may indicate a potential threat or challenging RF environment and is reported in result 205a for processing by the statistics analyzer 220.

The preamble validation circuit 310 is configured to decode a preamble of the message for cases where the message or waveform is expected to include a preamble. An invalid preamble may indicate a potential threat or abnormal RF congestion and is reported in result 205b for processing by the statistics analyzer 220.

The correlation scoring circuit 320 is configured to generate a correlation score associated with the message or waveform. For example, in some applications, data symbols within the message or waveform may be Walsh encoded and a correlation decoder is used to obtain the data symbols. In such cases the correlation should exhibit a single peak associated with a relatively high correlation score, so the presence of two or more smaller peaks could indicate a problem with the message and a potential threat or abnormal RF congestion, which is reported in result 205c for processing by the statistics analyzer 220.

The decryption circuit 330 is configured to decrypt the message and report a failure in the decryption process. Decryption failures may indicate that the sender does not have a valid encryption key which may indicate a potential anomaly, which is reported in result 205d for processing by the statistics analyzer 220.

The repetition monitor 340 is configured to detect repetitions of the message or parts thereof. The RF environment monitor and response system is configured to detect these repetitions, whether intentional or unintentional, and adjust processing to optimize the performance of the system. In some embodiments, a relatively small number of repetitions (e.g., two or three) may be allowed, to increase the probability of detection of legitimate waveforms, but a greater number of repetitions may indicate a potential anomaly, which is reported in result 205e for processing by the statistics analyzer 220.

The source geolocating circuit 350 is configured to decode angle of arrival (AOA) information in the message. In some situations, the location of the transmitter may be approximately known, or anticipated to some degree, and so an unexpected AOA may indicate a potential anomaly, whether intentional or unintentional, which is reported in result 205f for processing by the statistics analyzer 220.

The ECC monitor is configured to detect ECC errors associated with the message. For example, in some applications a Reed-Solomon ECC code may be employed to provide correction of a small number of bit errors in the message. Failure of the ECC scheme to correct the errors could indicate an abnormally dense RF environment, which is reported in result 205g for processing by the statistics analyzer 220.

In some embodiments, the RF signal waveform is an Identification Friend or Foe (IFF) transponder waveform or an IFF interrogator waveform (e.g., IFF mode 5 waveforms). For an IFF application, validation of the timing and synchronization of the message may be based on a Communications Security Validity Interval. Also, for an IFF signal, the AOA decoding may be based on monopulse Interrogator Sidelobe Suppression or Receiver Sidelobe Suppression processing.

Figure 4:
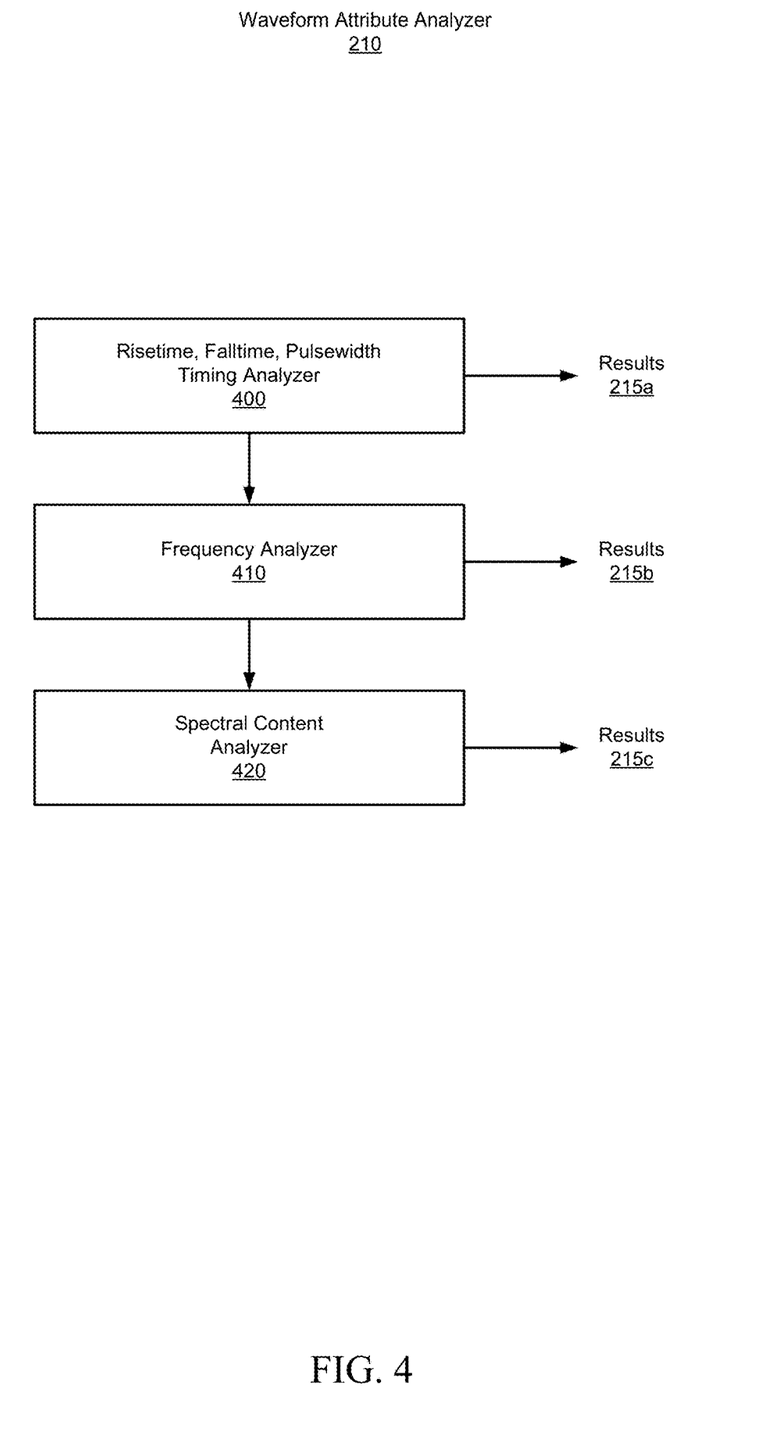
FIG. 4 is a block diagram of the waveform attribute analyzer of FIG. 2, configured in accordance with certain embodiments of the present disclosure.

FIG. 4 is a block diagram of the waveform attribute analyzer 210 of FIG. 2, configured in accordance with certain embodiments of the present disclosure. The waveform attribute analyzer 210 is shown to include a timing analyzer 400, a frequency analyzer 410, and a spectral content analyzer 420.

The timing analyzer 400 is configured to analyze or measure rise times, fall times, and/or pulse widths of pulse envelopes in the waveform and report detection of any abnormal characteristics (e.g., values out of spec), as result 215a for processing by the statistics analyzer 220.

The frequency analyzer 410 is configured to analyze the frequency of the waveform and report detection of any unexpected frequencies, as result 215b for processing by the statistics analyzer 220.

The spectral content analyzer 420 is configured to analyze the spectral content of the waveform and report any abnormal characteristics (e.g., spectral mask violations), as result 215c for processing by the statistics analyzer 220.

The statistics analyzer 220 is configured to recognize multiple occurrences of bad data, as reported by any of the decoding operation results 205 or waveform analysis results 215 described above. Such recognition may be an indication of high RF congestion, jamming, or an RF cyber-attack.

Methodology

Figure 5:
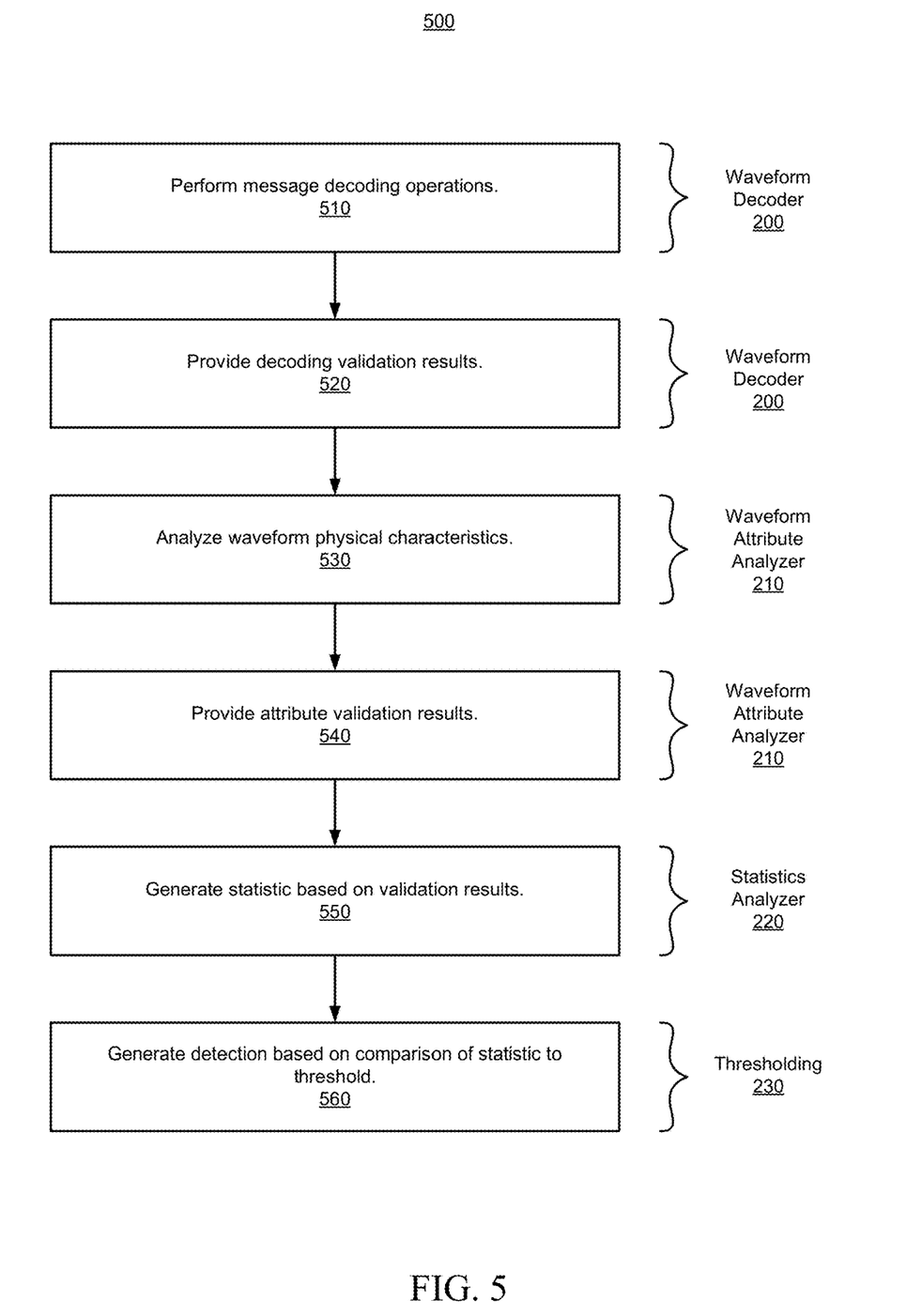
FIG. 5 is a flowchart illustrating a methodology for RF environment monitoring and response, in accordance with an embodiment of the present disclosure.

FIG. 5 is a flowchart illustrating a methodology 500 for RF environment monitoring and response, in accordance with an embodiment of the present disclosure. As can be seen, example method 500 includes a number of phases and sub-processes, the sequence of which may vary from one embodiment to another. However, when considered in aggregate, these phases and sub-processes form a process for enhancing processing performance based on the RF environment, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by performing message decoding operations on a received RF signal waveform. In some embodiments, the message decoding operations include one or more of validating timing and synchronization of the message, decoding a preamble of the message, generating a correlation score associated with the message, decrypting the message, detecting repetitions of the message, decoding angle of arrival information in the message, and detecting ECC errors associated with the message.

At operation 520, a decoding validation result 205 is provided by the waveform decoder 200 for one or more of the message decoding operations. The decoding results 205 provide an indication of failures or abnormalities in any of the decoding operations, as previously described.

At operation 530, physical characteristics of the received RF signal waveform are analyzed. In some embodiments, the physical characteristics include one or more of rise times, fall times, and pulse widths of pulses of the waveform, frequency of the waveform, and spectral content of the waveform.

At operation 540, an attribute validation result 215 is provided by the waveform attribute analyzer 210 for one or more of the physical characteristics. The attribute validation results 215 provide an indication of detected abnormalities in the physical characteristics of the waveforms, as previously described.

At operation 550, a statistic is generated by the statistic analyzer 220. The statistic is based on the decoding validation results and the attribute validation results for the current and previous received RF signal waveforms. In some embodiments, the statistic is an occurrence rate associated with the decoding validation results indicating a failure and/or the attribute validation results indicating a failure for the current waveform and/or previously received waveforms. For example, occurrence rates may take the form of M failures out of N decoding operation attempts or M failures out of N physical characteristic analyses.

At operation 560, an anomaly detection is generated, by the thresholding system 230, based on a comparison of the generated statistic to a threshold value. For example, if more than M/N failures of a message preamble validation occur in combination with more than K/L occurrences of waveform timing abnormalities, then an anomaly detection may be generated.

Of course, in some embodiments, additional operations may be performed, as previously described in connection with the system. For example, an alert may be provided in response to the generated anomaly detection. The alert may be an aural alert, a visual alert, and/or a haptic alert. In some embodiments, an action may be performed in response to the generated anomaly detection. The action may include one or more of geolocating a source of the received RF signal waveform, performing anti jamming frequency excision, and suspending transmission of message replies.

In some embodiments, the RF signal waveform is an IFF transponder waveform or an IFF interrogator waveform and the message decoding operations include one or more of validating timing and synchronization of a message based on CVI and decoding angle of arrival information in the message based on monopulse ISLS or RSLS.

Example System

Figure 6:
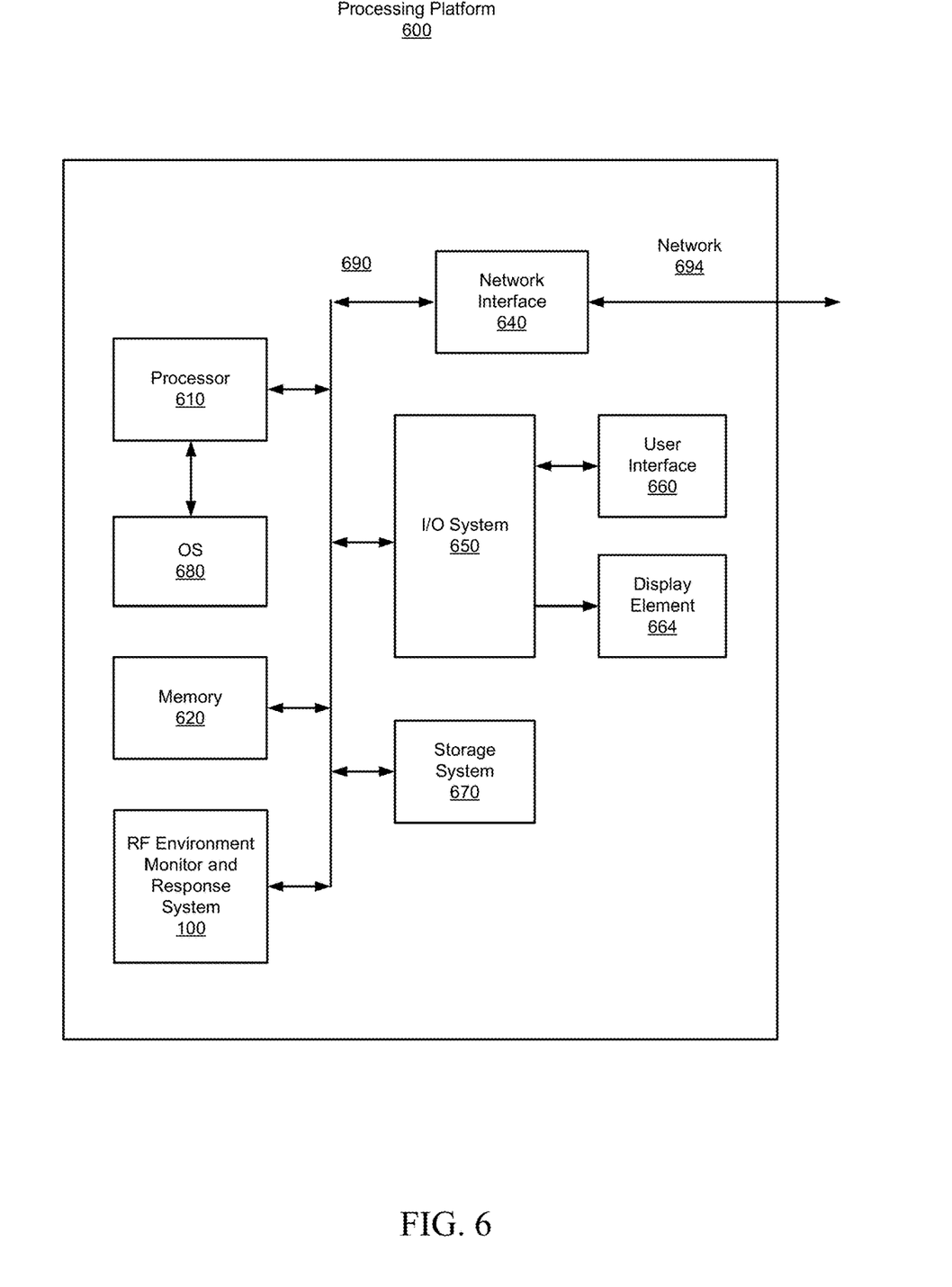
FIG. 6 is a block diagram of a processing platform configured to provide RF environment monitoring and response, in accordance with an embodiment of the present disclosure.

FIG. 6 is a block diagram of a processing platform 600 configured to provide RF environment monitoring and response, in accordance with an embodiment of the present disclosure. In some embodiments, platform 600, or portions thereof, may be hosted on, or otherwise be incorporated into the electronic systems of an aircraft, a projectile, a missile, a space-based platform, or a ground based platform, including data communications systems, radar systems, computing systems, or embedded systems of any sort, where RF signals are received and/or transmitted based on a known standard. Any combination of different devices may be used in certain embodiments.

In some embodiments, platform 600 may comprise any combination of a processor 110, a memory 620, the RF environment monitor and response system 100, a network interface 640, an input/output (I/O) system 650, a user interface 660, a display element 664, and a storage system 670. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in the execution of mission software and/or any control and processing operations associated with platform 600. In some embodiments, the processor 620 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array (FPGA) or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware or software.

RF environment monitor and response system 100 is configured to provide protection against various challenging RF environments, as described previously. The RF environment monitor and response system 100 may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is an RF environment monitor and response system comprising: a waveform decoder configured to perform a plurality of message decoding operations on a received radio frequency (RF) signal waveform and to provide a decoding validation result for one or more of the message decoding operations; a waveform attribute analyzer configured to analyze physical characteristics of the received RF signal waveform and to provide an attribute validation result for one or more of the physical characteristics; a statistics analyzer configured to generate a statistic based on the decoding validation results and the attribute validation results; and a thresholding system configured to generate an anomaly detection based on a comparison of the generated statistic to a threshold value.

Example 2 includes the RF environment monitor and response system of Example 1, wherein the message decoding operations include one or more of validating timing and synchronization of the message, decoding a preamble of the message, generating a correlation score associated with the message, decrypting the message, detecting repetitions of the message, decoding angle of arrival information in the message, and detecting error correction code (ECC) errors associated with the message.

Example 3 includes the RF environment monitor and response system of Examples 1 or 2, wherein the physical characteristics include one or more of rise times, fall times, and pulse widths of pulses of the waveform, frequency of the waveform, and spectral content of the waveform.

Example 4 includes the RF environment monitor and response system of any of Examples 1-3, wherein the statistic is an occurrence rate associated with the decoding validation results indicating a failure and the attribute validation results indicating a failure.

Example 5 includes the RF environment monitor and response system of any of Examples 1-4, wherein the RF signal waveform is a current RF signal waveform, and the statistics analyzer is configured to generate the statistic based on the decoding validation results and the attribute validation results of the current RF signal waveform and further based on decoding validation results and attribute validation results of one or more previous RF signal waveforms.

Example 6 includes the RF environment monitor and response system of any of Examples 1-5, wherein the RF signal waveform is an Identification Friend or Foe (IFF) transponder waveform or an IFF interrogator waveform.

Example 7 includes the RF environment monitor and response system of any Example 6 6, wherein the message decoding operations include one or more of validating timing and synchronization of the message based on a Communications Security Validity Interval and decoding angle of arrival information in the message based on monopulse Interrogator Sidelobe Suppression or Receiver Sidelobe Suppression.

Example 8 includes the RF environment monitor and response system of any of Examples 1-7, further comprising an alerting system configured to provide an alert in response to the generated anomaly detection, the alert including one or more of an aural alert, a visual alert, and a haptic alert.

Example 9 includes the RF environment monitor and response system of any of Examples 1-8, further comprising a response system configured to perform an action in response to the generated anomaly detection, the action including one or more of geolocating a source of the received RF signal waveform, performing anti jamming frequency excision, and suspending transmission of message replies.

Example 10 is a computer program product including one or more non-transitory machine-readable mediums encoded with instructions that when executed by one or more processors cause a process to be carried out for RF environment monitoring and response, the process comprising: performing a plurality of message decoding operations on a received radio frequency (RF) signal waveform; providing a decoding validation result for one or more of the message decoding operations; analyzing physical characteristics of the received RF signal waveform; providing an attribute validation result for one or more of the physical characteristics; generating a statistic based on the decoding validation results and the attribute validation results; and generating an anomaly detection based on a comparison of the generated statistic to a threshold value.

Example 11 includes the computer program product of Example 10, wherein the message decoding operations include one or more of validating timing and synchronization of the message, decoding a preamble of the message, generating a correlation score associated with the message, decrypting the message, detecting repetitions of the message, decoding angle of arrival information in the message, and detecting error correction code (ECC) errors associated with the message; and the physical characteristics include one or more of rise times, fall times, and pulse widths of pulses of the waveform, frequency of the waveform, and spectral content of the waveform.

Example 12 includes the computer program product of Examples 10 or 11, wherein the statistic is an occurrence rate associated with the decoding validation results indicating a failure and the attribute validation results indicating a failure.

Example 13 includes the computer program product of any of Examples 10-12, wherein the RF signal waveform is a current RF signal waveform, and the process further comprises generating the statistic based on the decoding validation results and the attribute validation results of the current RF signal waveform and further based on decoding validation results and attribute validation results of one or more previous RF signal waveforms.

Example 14 includes the computer program product of any of Examples 10-13, wherein the RF signal waveform is an Identification Friend or Foe (IFF) transponder waveform or an IFF interrogator waveform, and the message decoding operations include one or more of validating timing and synchronization of the message based on a Communications Security Validity Interval and decoding angle of arrival information in the message based on monopulse Interrogator Sidelobe Suppression or Receiver Sidelobe Suppression.

Example 15 includes the computer program product of any of Examples 10-14, wherein the process further comprises providing an alert in response to the generated anomaly detection, the alert including one or more of an aural alert, a visual alert, and a haptic alert, and performing an action in response to the generated anomaly detection, the action including one or more of geolocating a source of the received RF signal waveform, performing anti-jamming frequency excision, and suspending transmission of message replies.

Example 16 is a method for RF environment monitoring and response, the method comprising: performing, by a processor-based system, a plurality of message decoding operations on a received radio frequency (RF) signal waveform; providing, by the processor-based system, a decoding validation result for one or more of the message decoding operations; analyzing, by the processor-based system, physical characteristics of the received RF signal waveform; providing, by the processor-based system, an attribute validation result for one or more of the physical characteristics; generating, by the processor-based system, a statistic based on the decoding validation results and the attribute validation results; and generating, by the processor-based system, an anomaly detection based on a comparison of the generated statistic to a threshold value.

Example 17 includes the method of Example 16, wherein the message decoding includes one or more of validating timing and synchronization of the message, decoding a preamble of the message, generating a correlation score associated with the message, decrypting the message, detecting repetitions of the message, decoding angle of arrival information in the message, and detecting error correction code (ECC) errors associated with the message; and the physical characteristics include one or more of rise times, fall times, and pulse widths of pulses of the waveform, frequency of the waveform, and spectral content of the waveform.

Example 18 includes the method of Examples 16 or 17, wherein the statistic is an occurrence rate associated with the decoding validation results indicating a failure and the attribute validation results indicating a failure.

Example 19 includes the method of any of Examples 16-18, wherein the RF signal waveform is an Identification Friend or Foe (IFF) transponder waveform or an IFF interrogator waveform, and the message decoding includes one or more of validating timing and synchronization of the message based on a Communications Security Validity Interval and decoding angle of arrival information in the message based on monopulse Interrogator Sidelobe Suppression or Receiver Sidelobe Suppression.

Example 20 includes the method of any of Examples 16-19, wherein the method further comprises providing an alert in response to the generated anomaly detection, the alert including one or more of an aural alert, a visual alert, and a haptic alert, and performing an action in response to the generated anomaly detection, the action including one or more of geolocating a source of the received RF signal waveform, performing anti jamming frequency excision, and suspending transmission of message replies.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An RF environment monitor and response system comprising:
   a waveform decoder configured to perform a plurality of message decoding operations on a received radio frequency (RF) signal waveform and to provide a decoding validation result for one or more of the message decoding operations;
   a waveform attribute analyzer configured to analyze physical characteristics of the received RF signal waveform and to provide an attribute validation result for one or more of the physical characteristics;
   a statistics analyzer configured to generate a statistic based on the decoding validation results and the attribute validation results;
   a thresholding system configured to generate an anomaly detection based on a comparison of the generated statistic to a threshold value;
   wherein the message decoding operations includes validating timing and synchronization of the message, decoding a preamble of the message, generating a correlation score associated with the message, decrypting the message, detecting repetitions of the message, decoding angle of arrival information in the message, and detecting error correction code (ECC) errors associated with the message.

2. The RF environment monitor and response system of claim 1, wherein the physical characteristics include one or more of rise times, fall times, and pulse widths of pulses of the waveform, frequency of the waveform, and spectral content of the waveform.

3. The RF environment monitor and response system of claim 1, wherein the statistic is an occurrence rate associated with the decoding validation results indicating a failure and the attribute validation results indicating a failure.

4. The RF environment monitor and response system of claim 1, wherein the RF signal waveform is a current RF signal waveform, and the statistics analyzer is configured to generate the statistic based on the decoding validation results and the attribute validation results of the current RF signal waveform and further based on decoding validation results and attribute validation results of one or more previous RF signal waveforms.

5. The RF environment monitor and response system of claim 1, wherein the RF signal waveform is an Identification Friend or Foe (IFF) transponder waveform or an IFF interrogator waveform.

6. The RF environment monitor and response system of claim 5, wherein the message decoding operations include one or more of validating timing and synchronization of the message based on a Communications Security Validity Interval and decoding angle of arrival information in the message based on monopulse Interrogator Sidelobe Suppression or Receiver Sidelobe Suppression.

7. The RF environment monitor and response system of claim 1, further comprising an alerting system configured to provide an alert in response to the generated anomaly detection, the alert including one or more of an aural alert, a visual alert, and a haptic alert.

8. The RF environment monitor and response system of claim 1, further comprising a response system configured to perform an action in response to the generated anomaly detection, the action including one or more of geolocating a source of the received RF signal waveform, performing anti-jamming frequency excision, and suspending transmission of message replies.

9. A computer program product including one or more non-transitory machine-readable mediums encoded with instructions that when executed by one or more processors cause a process to be carried out for RF environment monitoring and response, the process comprising:
performing a plurality of message decoding operations on a received radio frequency (RF) signal waveform;
providing a decoding validation result for one or more of the message decoding operations;
analyzing physical characteristics of the received RF signal waveform;
providing an attribute validation result for one or more of the physical characteristics;
generating a statistic based on the decoding validation results and the attribute validation results; and
generating an anomaly detection based on a comparison of the generated statistic to a threshold value;
wherein the message decoding operations includes validating timing and synchronization of the message, decoding a preamble of the message, generating a correlation score associated with the message, decrypting the message, detecting repetitions of the message, decoding angle of arrival information in the message, and detecting error correction code (ECC) errors associated with the message.

10. The computer program product of claim 9, wherein the statistic is an occurrence rate associated with the decoding validation results indicating a failure and the attribute validation results indicating a failure.

11. The computer program product of claim 9, wherein the RF signal waveform is a current RF signal waveform, and the process further comprises generating the statistic based on the decoding validation results and the attribute validation results of the current RF signal waveform and further based on decoding validation results and attribute validation results of one or more previous RF signal waveforms.

12. The computer program product of claim 9, wherein the RF signal waveform is an Identification Friend or Foe (IFF) transponder waveform or an IFF interrogator waveform, and the message decoding operations include one or more of validating timing and synchronization of the message based on a Communications Security Validity Interval and decoding angle of arrival information in the message based on monpulse Interrogator Sidelobe Suppression or Receiver Sidelobe Suppression.

13. The computer program product of claim 9, wherein the process further comprises providing an alert in response to the generated anomaly detection, the alert including one or more of an aural alert, a visual alert, and a haptic alert, and performing an action in response to the generated anomaly detection, the action including one or more of geolocating a source of the received RF signal waveform, performing anti-jamming frequency excision, and suspending transmission of message replies.

14. A method for RF environment monitoring and response, the method comprising:
performing, by a processor-based system, a plurality of message decoding operations on a received radio frequency (RF) signal waveform;
providing, by the processor-based system, a decoding validation result for one or more of the message decoding operations;
analyzing, by the processor-based system, physical characteristics of the received RF signal waveform;
providing, by the processor-based system, an attribute validation result for one or more of the physical characteristics;
generating, by the processor-based system, a statistic based on the decoding validation results and the attribute validation results; and
generating, by the processor-based system, an anomaly detection based on a comparison of the generated statistic to a threshold value;
wherein the message decoding operations includes validating timing and synchronization of the message, decoding a preamble of the message, generating a correlation score associated with the message, decrypting the message, detecting repetitions of the message, decoding angle of arrival information in the message, and detecting error correction code (ECC) errors associated with the message.

15. The method of claim 14, wherein the statistic is an occurrence rate associated with the decoding validation results indicating a failure and the attribute validation results indicating a failure.

16. The method of claim 14, wherein the RF signal waveform is an Identification Friend or Foe (IFF) transponder waveform or an IFF interrogator waveform, and the message decoding includes one or more of validating timing and synchronization of the message based on a Communications Security Validity Interval and decoding angle of arrival information in the message based on monpulse Interrogator Sidelobe Suppression or Receiver Sidelobe Suppression.

17. The method of claim 14, wherein the method further comprises providing an alert in response to the generated anomaly detection, the alert including one or more of an aural alert, a visual alert, and a haptic alert, and performing an action in response to the generated anomaly detection, the action including one or more of geolocating a source of the received RF signal waveform, performing anti-jamming frequency excision, and suspending transmission of message replies.

\* \* \* \* \*